Feb. 1, 1949.   O. I. OYLER   2,460,429
ARTICULATED VEHICLE
Filed May 11, 1946   8 Sheets-Sheet 1

OTTO I OYLER  INVENTOR

BY  Ely & Frye

ATTORNEYS

Feb. 1, 1949.　　　　O. I. OYLER　　　　2,460,429
ARTICULATED VEHICLE
Filed May 11, 1946　　　　　　　　　　　　　　　8 Sheets-Sheet 2

OTTO I OYLER　INVENTOR

BY

ATTORNEYS

Feb. 1, 1949.    O. I. OYLER    2,460,429
ARTICULATED VEHICLE
Filed May 11, 1946    8 Sheets-Sheet 5

INVENTOR
OTTO I OYLER
BY
Ely & Frye
ATTORNEYS

Feb. 1, 1949.　　　　　　O. I. OYLER　　　　　　2,460,429
ARTICULATED VEHICLE
Filed May 11, 1946　　　　　　　　　　　　　8 Sheets-Sheet 6

OTTO I. OYLER　　INVENTOR

BY　Ely & Frye

ATTORNEYS

Patented Feb. 1, 1949

2,460,429

UNITED STATES PATENT OFFICE 2,460,429

ARTICULATED VEHICLE

Otto I. Oyler, Canton, Ohio

Application May 11, 1946, Serial No. 669,183

24 Claims. (Cl. 280—81)

GENERAL DESCRIPTION, PURPOSES AND ADVANTAGES OF THE INVENTION

The present invention has as its principal object the construction of large trailers or other vehicles such as used in the transportation of freight. Trailers of the general type shown in the drawings are connected for operation to the rear of a tractor by means of a so-called kingpin which is coupled to the fifth wheel of the tractor, so that there is freedom of movement about the kingpin.

There have heretofore been practical limitations on the length of trailers due to the inability of the wheels of the trailer to track properly in negotiating curves in the highway. If the wheels do not track properly, the power consumed, the wear upon the tires, and the instability of the load make the use of long trailers uneconomical and dangerous. This has been particularly true in the use of tandem axle trailers because the overall dimensions of trailers and the distances between the tractor and the two sets of wheels are so great that the problems of tracking have heretofore prevented their wide adoption and use. Added to this, objection to the use of tandem-axle trailers has been the difficulty in handling, the tendency of the trailers to overturn, and the lack of steadiness in their operation.

The operation of very long tandem axle trailers is further complicated by irregularities in road surfaces which require that the entire assembly have a jointed or articulated construction so that the wheels may adapt themselves to the irregularities in the road surface and yet the assembly should not be so loosely connected that it will weave about on the road or create excessive movement of the body.

The present invention relates to tandem-axle vehicles, especially trailers, in which the rear of the body or chassis remote from the power plant or the fifth wheel of the trailer is supported on a four-wheel assembly which is composed of a dual carriage, each section of the carriage being supported upon one pair of wheels. The body or chassis is connected to the forward section by a trunnion shaft which permits the chassis and the forward section to rock with respect to one another so as to allow the forward section to follow undulations in the road surface independently of the chassis. The forward section, however, does not have any provision for independent sidewise rocking action with respect to the chassis and this is essential as the chassis should partake of any such movement which may be due to banking at curves in the highway. However, it has been found necessary to provide some means of stabilizing the vehicle by dampening the side sway, and for this purpose the forward section is provided with a novel and efficient form of stabilizer which is peculiarly adapted to the reduction of side sway in large and heavily loaded vehicles such as are contemplated by the present invention.

The rear section is articulated to the forward section, but has no direct connection to the chassis. The method of articulating the rear section of the dual bogie to the forward section is novel and ingenious as it is designed to permit a great freedom of movement to the rear section which will permit it to follow every irregularity in the road surface without affecting the chassis and without affecting the forward section. In both straightaway travel and in rounding curves, the rear section may drop into chuck holes or rise over bumps and irregularities in the road without imparting any of its movement to the other parts of the vehicle.

The rear section is also connected to the forward section so that in rounding curves in the highway, the rear section will swivel as a unit so that the rear wheels will not scrape or slide over the road surface, but will track perfectly. This is a particularly valuable attribute of the construction shown herein and contributes to the economical and efficient operation of the trailer. In securing this result the present invention employs what may be termed a heel and toe action, as two pivotal points are provided on either side of the center line of the trailer so that in swinging in one direction the pivotal movement takes place about a center at one side of the center line of the trailer, while in swinging in the opposite direction the pivotal movement takes place about a center on the other side of the trailer. In straightaway travel, whether forward or in backing, both centers of pivotal movement are in engagement which reduces side sway or whipping of the rear bogie and also permits the trailer to be backed in a straight line.

In the respects just mentioned, the present invention follows the basic principles of applicant's former Patent No. 2,252,135 of August 12, 1941, but the mechanism is improved and modified so as to be adaptable to the dual-bogie construction herein described.

The tying together or articulation of the forward and rear sections of the dual bogie is an especial feature of the present design as it utilizes the downward thrust due to the load on each section to draw the sections together. In this respect, the present invention follows in a measure the basic principles of the earlier Oyler patent referred to, but the present design is a substantial advance over the old in that the load on both sections serves to draw the two sections together, and as this draws the two pivotal surfaces together, any tendency of the rear section to sway or whip about is resisted. This, however, does not prevent the swiveling movement of the rear section with respect to the front section when the vehicle is rounding curves.

A further advantage of the present construction is that the total load of the trailer and its contents is equally divided at all times between the two sections of the dual bogie so that each pair of wheels shares equally in the work. The result is accomplished by locating the main trunnion between the chassis and the dual bogie midway between the front and rear axles and then tying together the two sections so that each section carries its full share of the load at all times.

The fact that the load of the chassis (other than that borne by the tractor or other power unit at the front end of the vehicle) is concentrated at one point and from that point is distributed equally to the two sections is one of the principal advantages of the present invention, especially in view of the fact that the two sections have a freedom of relative movement which permits the rear section to rock or swing in all directions, except downwardly at its forward end, beyond the straight line position, without transmitting any of its movement to the forward section. In this connection, it will be noted that there is no stabilizer on the rear section, indeed the ability of the rear section to rock freely about a horizontal front-and-rear axis without imparting any tendency of the vehicle to overturn is one of the principal advantages of the present construction.

It will also be noted, in connection with the contents of the preceding paragraph, that the equalized distribution of the load to both sections makes it unnecessary to adopt any special precautions in loading the vehicle. In the patent referred to above, it was necessary to load the vehicles so that the preponderance of the load was not located to the rear of the axle of the rear carriage, otherwise the tendency of the two vehicles to draw together would be lost and they might draw apart. In the present design, the location of the load borne by the chassis is wholly immaterial, for wherever the preponderance of the load is placed, whether in the front of the chassis or at the rear, it will contribute to the drawing together of the two sections.

One of the practical advantages flowing from the invention is that it allows a much greater pay load than has been possible with prior tandem trailers. The operation is more economical of fuel and tires because of the perfect tracking of the two sets of wheels. Any tendency of the vehicle to overturn is resisted because the forward set of wheels is provided with an efficient and adequate stabilizer and because the rear set of wheels may rock freely about a horizontal axis without transmitting any of the centrifugal forces created thereby to the chassis.

The trailer may be run with safety at much higher speeds than were practical with tandem trailers of other designs and there is greater steadiness of the chassis than has been possible in prior trailers of this type. Due to its great flexibility, the trailer is easily handled and extremely heavy loads may be driven with less fatigue of the operator.

There are other advantages which are secured with the construction shown and described herein and which will be apparent from the disclosure. The trailer illustrated herein has been subjected to severe and thorough road tests and has been found to be superior to other tandem trailers in the respects cited above.

While the invention is primarily intended for tandem trailers, certain features thereof may be used advantageously in two-wheel trailers and in truck and bus constructions.

It will be appreciated that this application fully describes the best known and preferred form of the invention as it has been successfully reduced to practice, but it is possible that this design may be improved or modified without in any way departing from the basic features of the invention as set forth in the appended claims. In connection with the drawings and description, there are necessarily disclosed certain adjuncts which are no part of the present invention, such, for example, as the braking system which is intended to be of the vacuum type. These parts are shown only to the extent necessary for a complete understanding of the entire vehicle.

SHORT DESCRIPTION OF THE DRAWINGS

In the drawings in which the construction of an actual embodiment of the invention is shown.

THE TRAILER CHASSIS AND DECK

In the following description of the chassis and associated parts, particular reference should be made to Figs. 1, 2, 15, 16 and 17.

The chassis comprises a long rectangular framework which comprises the two longitudinal channel beams 1 which, except that one is right and the other left, are identical. The central portions of the beams may be depressed at the location of the dual bogie. Across the beams are secured the several transverse braces 2 at appropriate intervals and between the two forward braces is located the plate 4 to which the kingpin 5 is secured. This is a usual type of coupling for attachment to a standard form of tractor such as shown in dotted outline at 6 in Fig. 2.

Figure 17:
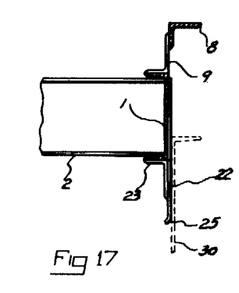
Fig. 17 is a fragmentary section on the line 17—17 of Fig. 16.

To the outer faces of the beams 1 and extending the entire length thereof are the two angle iron side rails 8 which support the numerous transverse joists 10 which constitute the foundation for the floor or deck of the trailer. At the central portion of the chassis where the beams and side rails diverge, if this construction is used, a number of brackets 9 are welded across these elements (Fig. 17). Near the forward end of the chassis are secured the brackets 11 which carry any suitable type of landing gear 12, the design of which forms no part of the present invention. The assembly includes vacuum tanks 14 which through appropriate piping are connected to brakes for the wheels of the forward and rear sections.

At a point toward the rear of the chassis, the beams 1 are cut away, as at 16, to provide clearance for the main transverse trunnion shaft 18 on which the chassis is supported and on which it rocks vertically with respect to the forward section of the dual bogie. At this point a pair of bearings 20 are welded or otherwise secured to the inner face of each beam 1 to form journals for the trunnion shaft 18.

At a point on each beam 1 near the forward end of the forward section is located a wear plate 22 which extends below the beam and by sliding contact with the frame of the forward bogie section serves to guide the forward section in its movement about the main trunnion shaft 18. This wear plate is preferably welded to the outside of the beam and is braced by an angle bracket 23. As in operation there may be considerable oscillation between the chassis and the forward section, this wear plate normally extends a substantial distance below the lower edge of the beam and is rounded at its lower edge, as at 25, so that it will not interfere with the frame of the forward section of the dual bogie (shown in dotted lines in Fig. 17) in the event that the pivotal movement becomes excessive.

THE FORWARD SECTION OF THE DUAL BOGIE

The frame

Figure 11:
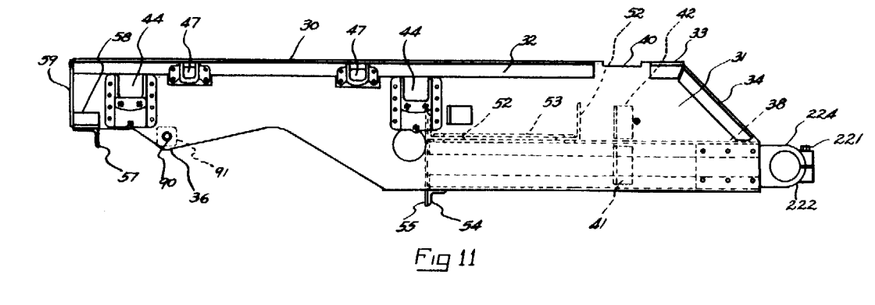
Fig. 11 is a side elevation and Fig. 12 is a plan view of the frame of the forward section of the dual bogie.

The forward section of the dual bogie is supported upon a frame which is indicated as a whole by the numeral 30. This element separated from the balance of the device is shown in Figs. 11 and 12.

The frame, in the embodiment shown, comprises two long plates or beams 31 which, except that one is right and the other left, are identical. The form of each plate 31 illustrated is in the general shape of a rectangle modified at certain points to accommodate various parts of the mechanism. It is reinforced along its upper edge by a long angle iron brace 32 and its upper rear corner is cut away at an angle so as not to interfere with the swinging movement of the rear section of the dual bogie, and at this point supplementary angle braces 33 and 34 are welded to the plate. The lower forward edge of the plate is cut away in an undulating pattern to accommodate the axle of the forward section, and a lobe 36 is located forwardly of this point to provide anchorage for the front axle stabilizer, to be described. Along the lower straight edge of the plate are welded the two facing parallel angle irons 38 between the rear extremities of which is located the connection to the rear section, as will be described.

Figures 5, 18:
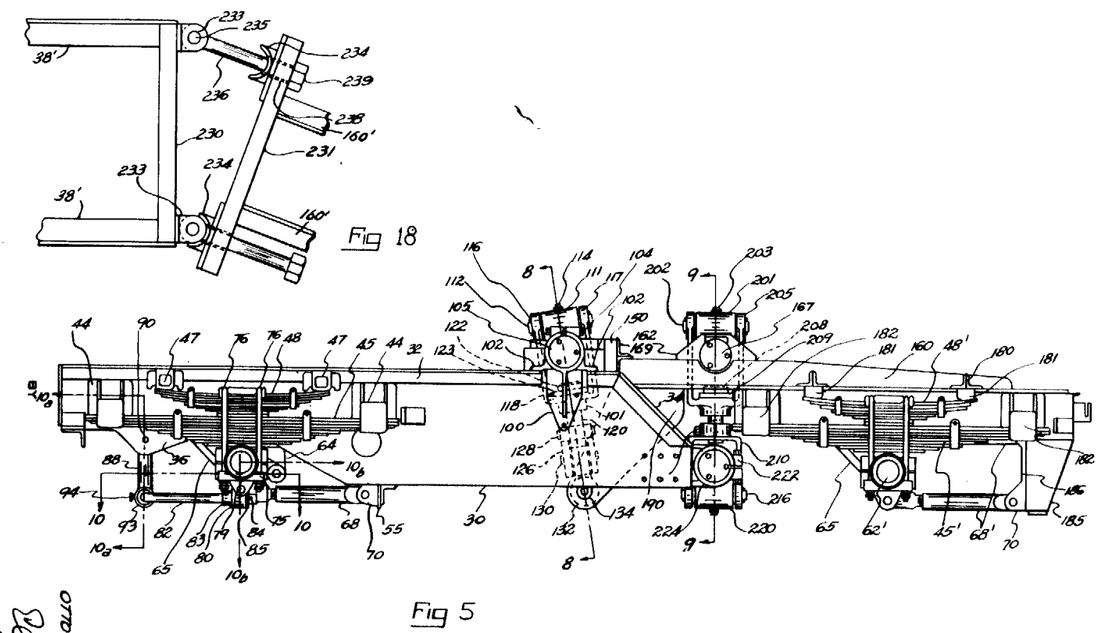
Fig. 5 is a side elevation thereof.
Fig. 18 is a view showing a modified means of connecting the articulated sections of the dual bogie.

Between the angle braces 32 and 33 the upper edge of the plate is cut away, as at 40, to accommodate the trunnion shaft mounting and immediately beneath this point are located the two short vertical angle iron braces 41 and 42. At the forward end of the plates are secured the main spring pads 44 which bear upon the ends of the main leaf spring 45 and the auxiliary spring pads 47 which bear upon the auxiliary leaf spring 48. This dual spring construction is optional and may be employed on trailers adapted to carry extremely heavy loads. In Fig. 5 these parts are shown in the position they assume when the trailer is under extreme load.

Figure 1:
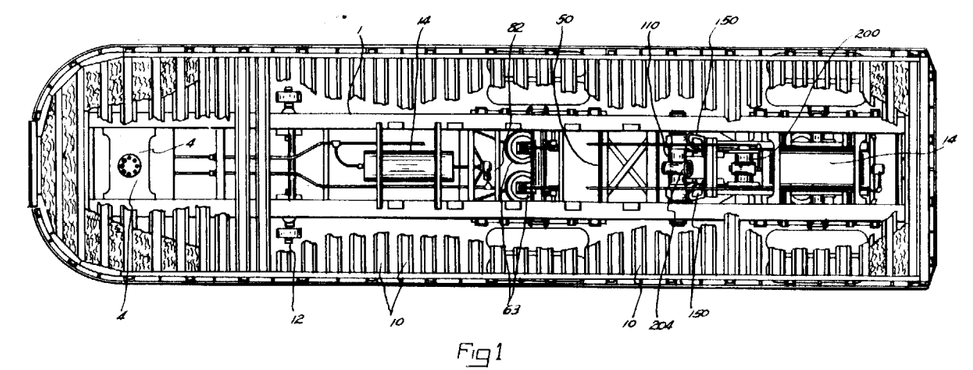
Fig. 1 is a plan view of a trailer, certain portions of the flooring or deck being broken away to expose the location of some of the major elements of the invention.
Figure 2:
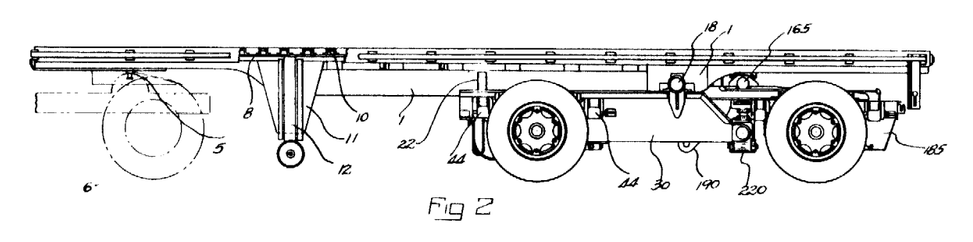
Fig. 2 is a side elevation of the complete trailer, the outline of the rear end of a tractor being shown in dotted lines at the left.
Figure 4:
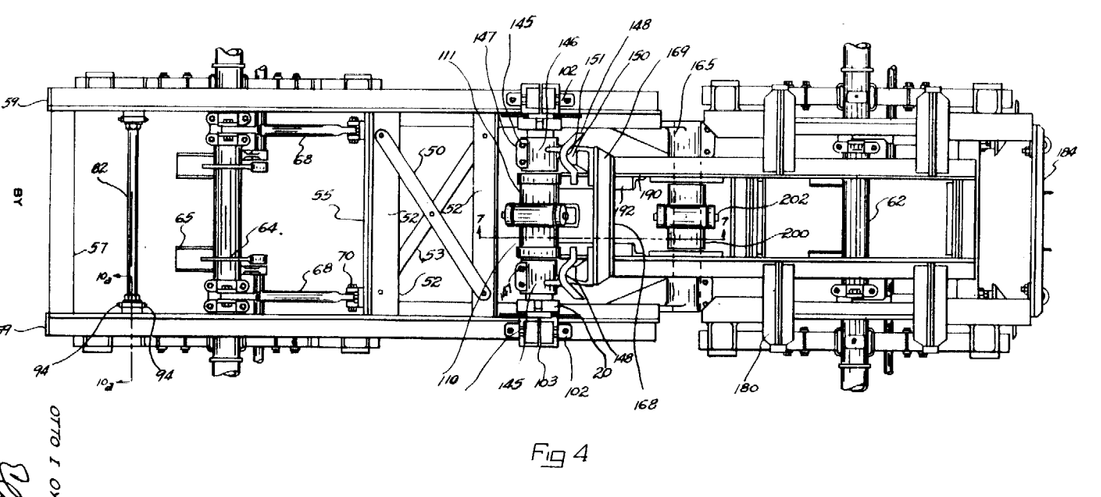
Fig. 4 is a plan view of the dual bogie.
Figure 12:
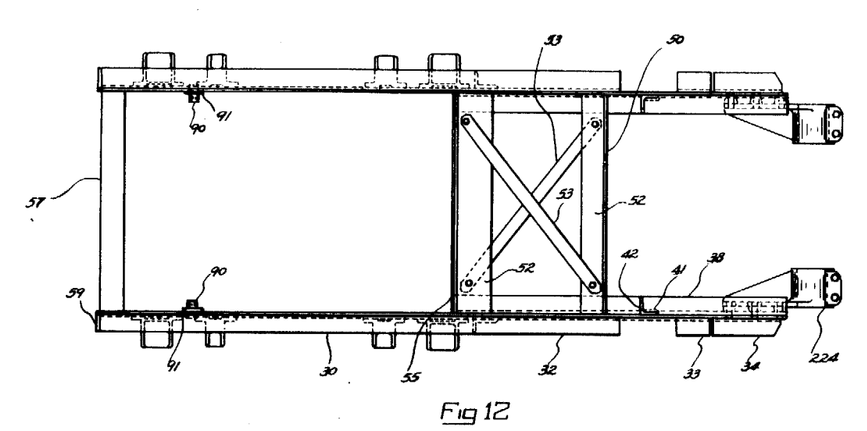

The two plates 31 are tied together, in this embodiment, by a truss or X-frame 50 shown in Figs. 1, 4 and 12. This frame consists of two parallel transverse angle irons 52 which are welded to the upper surfaces of the upper angles 38 and are turned at 90° with respect to one another as shown in dotted lines in Fig. 11. Diagonal braces 53 are welded to the upper and lower surfaces of the angles 52, as shown in Fig. 12. Across the front end of the angles 38 and welded to the forward iron 52 and to a cross angle iron 54 is a transverse plate 55. This construction just described holds the rear end of the forward section rigid under the heavy stresses to which it is subjected in service. The forward ends of the plates 31 are tied together by a transverse angle iron 57, the ends of which are welded to short brackets 58 on the front lower corners of the plates 31. A gusset plate 59 welded to the end of each frame completes this detail of construction.

The axle

The axle of the forward section is mounted at the deepest point in the undulating lower edges of the plates 31. The axle assembly of both sections is the same and the description given here will suffice for the rear section as well. Much of the design shown herein is standard or optional and only those parts which are necessary for an understanding of this invention will be described.

Figure 3:
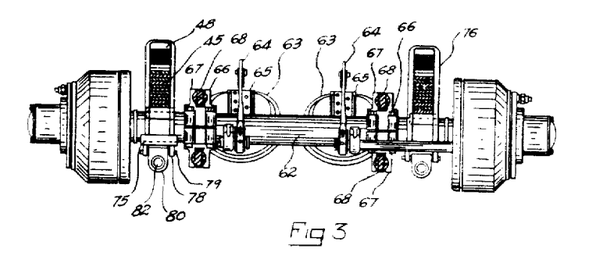
Fig. 3 is an elevation of the front axle assembly. Except for the presence of the stabilizers this view is typical of a rear axle assembly.

Referring particularly to Fig. 3. The main axle is indicated at 62 and carries the power chambers 63 which actuate the brake levers 64. The chambers are supported on brackets 65 attached to the axle. On either side of the levers 64 and secured to the axle are the two dual brackets 66 which are formed with the upper and lower bifurcated ears 67. Extending from the ears 67 are the two upper and lower parallel and adjustable radius rods 68, the rear ends of which are pivoted to clevises 70 welded to the transverse plate 55. It will be noted that there are four radius rods for each axle which may be desirable for extremely heavy duty, but two radius rods for each axle will ordinarily suffice. While the radius rods are shown as extending rearwardly of both axles, this detail may be redesigned by extending the radius rods forwardly from each axle.

The stabilizer

As explained in the opening portion of the specification, the forward section of the dual bogie and the chassis are connected so that while they have relative rocking movement fore and aft to permit the forward section to follow undulations in the road surface, these two elements are tied together by the main trunnion shaft 18. It is essential, therefore, to provide a stabilizing device to prevent the vehicle from excessive side sway and consequent danger of overturning. Stabilizers are well known in this art, but due to the excessively heavy loads created by the trailer here shown and the high speeds at which it is intended to operate, it has been necessary to devise a special form of stabilizer to meet the unusual conditions imposed by the construction of the present trailer. Special reference is made at this point to Figs. 10, 10ª and 10ᵇ of the drawings.

It will be understood that this design of stabilizer has great utility beyond this particular installation and may be employed in any vehicle in which the loads are so great that previous types of stabilizers are inadequate.

Figures 10, 10B:
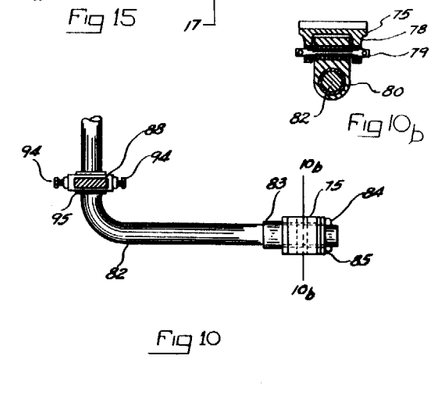
Fig. 10 is a section on the line 10—10 of Fig. 5, Fig. 10ª a section on the line 10ª—10ª of Fig. 4 and Fig. 10ᵇ a section on the line 10ᵇ—10ᵇ of Fig. 10. These views show the details of the stabilizer for the axle of the forward bogie section.
Figure 10A:
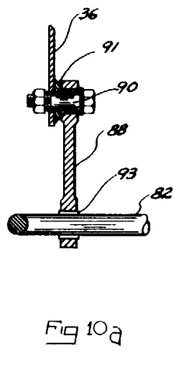

On the under side of each end of the axle 62 is a plate 75 in which are mounted the lower ends of two spring clevises 76. Between the anchorage points for these clevises two parallel depending lugs 78 are formed and through these lugs is a pivot pin 79 on which is mounted the bracket 80. The two brackets 80 constitute anchorages for the ends of the stabilizer bar 82. All of the bearings are suitably bushed as indicated in Fig. 10ᵇ.

The stabilizer bar is a heavy U-shaped steel rod, round in cross-section and forged from a high grade spring steel. For the trailer depicted here, the rod is made of 1½" diameter 4340 SAE steel, forged, heat treated and drawn so that it will not crystallize under the heavy and repeated torsional effects to which it is subjected in service. At the points adjacent the brackets 80, collars 83 are welded to the parallel reaches of the rod and the extremities of the rod are provided with apertures to receive the locking pins 84. Washers 85 are located between the pins 84 and the brackets 80.

The transverse reach of the stabilizer bar 82 is connected to the carriage 30 by the two vertical hangers 88. The upper end of each hanger is formed with a bearing which fits over a hollow pin which is secured to the lobe 36 as by welding. Final securement of the hanger to the lobe is effected by means of a bolt 90. A reinforcing plate 91 is welded to the inner surface of the lobe 36 allowing the pin to project sufficiently to form a bearing for the upper end of the hanger.

The lower end of each hanger is provided with an enlarged aperture which fits loosely around the transverse reach of the stabilizer rod. A split bushing 93, preferably of bronze, is interposed between the hanger and the rod and is held in position by set screws 94.

The operation of the stabilizer may be briefly described as follows: As the central portion of the stabilizer rod is held in fixed relation to the forward frame 30 by the hangers 88, any tendency of the forward section, and the chassis to which it is connected, to rock excessively is resisted by the force required to twist the rod. As the rod is a heavy spring member, the resistance to twisting increases in accordance with the amplitude of sidewise movement of the vehicle. The effect is to check any tendency of either side of the chassis to rock unduly and to restore the chassis to its normal level promptly.

So far as known, it is new and novel to connect the axle and body of a tandem axle vehicle through a torque rod which allows a limited side sway that is resisted by the inherent spring resistance to torsional deformation of the rod.

The main trunnion shaft and forward hanger

Figure 8:
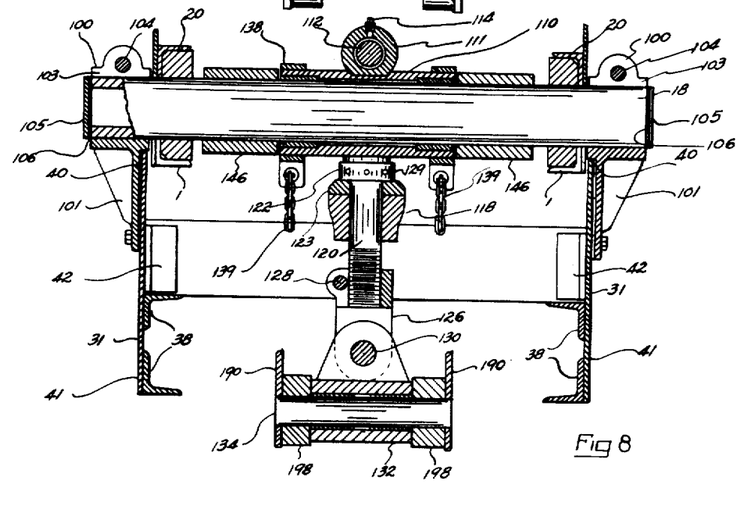
Fig. 8 is a vertical transverse section through the hanger from the forward section, the section being taken on the line 8—8 of Fig. 5.

It will be recalled that the main trunnion shaft 18 is mounted in the bearings 20 on the chassis. The extremities of the shaft are received in the heavy bearings 100 shown in side elevation in Fig. 5 and in section in Fig. 8. These bearings are seated in the notches 40 in the side plates 31. A depending brace 101 formed integrally with each bearing is bolted to the face of the side plate and lateral wings 102 extend over the angle irons 32 and 33 to which they are bolted. The upper side of the bearing 100 is divided by a saw cut 103 and a transverse bolt 104 serves to draw the bearing snugly around the trunnion shaft. A cover plate 105 is secured to each end of the trunnion shaft which is hollow throughout, a sealing gasket 106 being located between the plate and the end of the shaft. The interior of the shaft may be used as a reservoir for lubricant if desired.

The forward hanger which will now be described is pivotally suspended from the main trunnion shaft and, as shown in Fig. 5, extends downwardly and rearwardly in an oblique direction to the point where it is connected to the rear section of the dual bogie. This hanger has a pivotal movement about the main trunnion shaft to permit the rear section to rock upon a transverse horizontal axis. The hanger also has provision for axial movement to permit the rear section to swing to and fro with respect to the forward section and, in addition, provision for lateral swinging movement so as to permit the rear section to rock upon a horizontal axis parallel with the center line of the trailer. This universal movement, therefore, permits entire freedom of movement of the rear section so that it may accommodate itself to any and all irregularities of the road and may swivel in negotiating curves without affecting the forward section and the chassis carried thereby. At the same time the rear section shares its portion of the load with the forward section under any and all conditions.

Located around the central portion of the trunnion shaft is the relatively long and heavy bearing sleeve 110, to the upper side of which is welded a secondary bearing sleeve 111 arranged at right angles to the main bearing sleeve and parallel to and on the center line of the trailer. Located in the sleeve 111 is the shaft 112. Lubrication is provided through the plugged opening 114. The ends of shaft 112 project beyond the sleeve 111 and on these projecting ends are pivotally mounted the parallel arms 117 of a yoke 118. Cotter pins 116 hold the yoke on the shaft 112.

The central portion of the yoke 118 lies below the trunnion shaft 18 and is provided with a vertical bore in which is rotatably mounted the hanger pin 120 having an enlarged head 122 which is supported by a washer 123 resting upon the central portion of the yoke.

The lower end of the pin 120 is screw-threaded and engaged therewith is the depending clevis 126, the body of which is provided with a saw-cut across which extends the clamping bolt 128, whereby the clevis may be fixed in the desired position of adjustment on the pin 120. For securing the requisite adjustment of the parts which determines the ultimate length of the hanger, the head of the pin 120 is provided with apertures 129 by which it may be rotated. Across the clevis and held therein by cotter pins is the short shaft 130 from which is pivotally suspended the arm 132. In the lower end of this arm is a transverse bearing in which is pivotally mounted the transverse bearing shaft 134 to which the rear section is pivotally connected in the manner to be described in connection with a later portion of this specification.

Clamping collars 138 are located about the hub of the sleeve 110 to which safety chains 139 are attached, the other ends of the chains being attached to the rear section. These chains are provided solely as a precautionary measure in case of breakage of any of the connecting parts.

The "heel and toe" action

Before taking up the specfic description of the rear section of the dual bogie, the means will be described by which is obtained the "heel and toe" action in the swiveling movement of the rear section.

Mounted on the main trunnion shaft 18 at either side of the sleeve 110 are the two heavy bearing members or saddles, as they may be termed, which provide the fulcrums about which the rear section pivots selectively in its swiveling movement.

Each saddle or fulcrum, which is indicated as a whole by the numeral 145 (Fig. 6) comprises a split bearing sleeve 146 adapted to be clamped about the main trunnion shaft by bolts 147. To the rear of the shaft 18 each saddle is formed with a vertical web portion the face of which is formed with a vertical V-shaped recess or groove 148 having a rounded base which constitutes the fulcrum or bearing upon which the rear section will rock. This socket member 145 is heavily reinforced so as to take the loads which are placed upon it. The wide spread to the socket permits the coacting male or thrust member to leave its socket when the rocking movement is taking place about the other couple.

The male member of each pivotal couple is indicated at 150. This is a modified L-shape bracket heavily reinforced and provided with a rounded rib 151 which fits within the corresponding saddle or socket 148 and is capable of a rolling pivotal movement thereon. The two male members of the couples are bolted to the rear bogie in the manner to be described in connection with the detailed specifications thereof.

Figure 6:
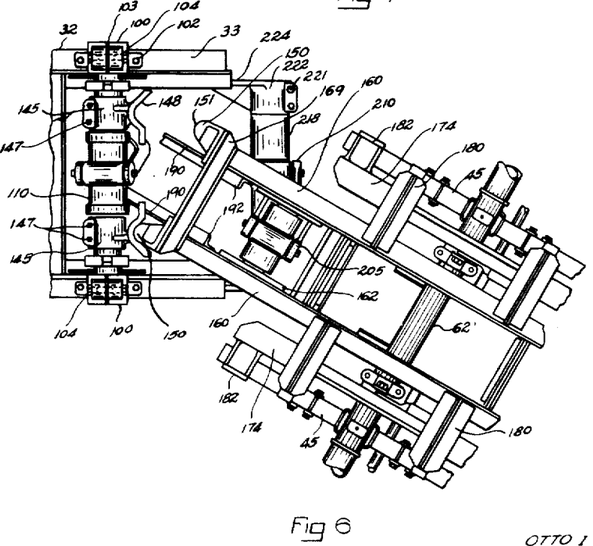
Fig. 6 is a plan view of the central or articulated portion of the dual bogie showing the rear section in angular relation to the forward section.

The action obtained by the construction is clearly illustrated by a comparison of Figs. 4 and 6. As the rear section moves in either direction from the straight line, one of the male members 150 constitutes the fulcrum of pivotal movement while the other leaves its saddle member. In swiveling in the opposite direction, the fulcrum shifts to the opposite saddle. This action, which is peculiar to this form of trailer, imparts a steering movement to the rear section, which is not obtained through an ordinary swivel pin connection. It enables the rear wheels to track perfectly in negotiating the sharpest of curves at the highest speeds and avoids all scuffing or side slip of the tires. It also reduces the tendency to skid and eliminates any tendency to side sway, which makes the vehicle safer in operation and more economical, not only in tire upkeep, but also in power consumption.

THE REAR SECTION OF THE DUAL BOGIE

The frame

Figure 9:
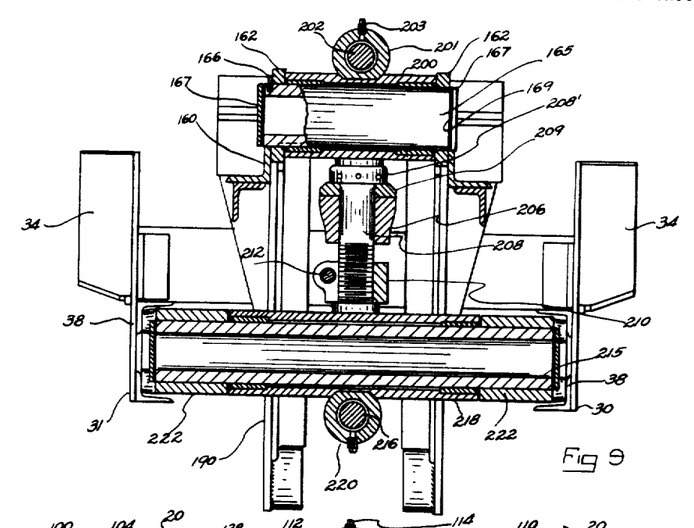
Fig. 9 is a vertical transverse section through the hanger from the rear section, the section being taken on the line 9—9 of Fig. 5.
Figure 13:
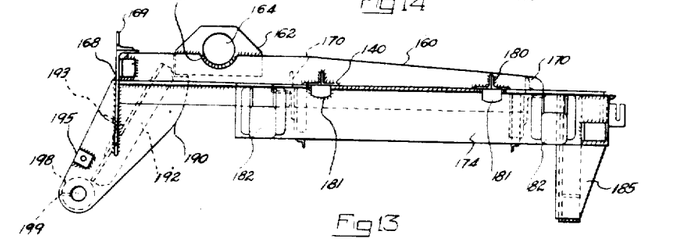
Fig. 13 is a side elevation and Fig. 14 is a plan view of the frame of the rear section of the dual bogie.
Figure 14:
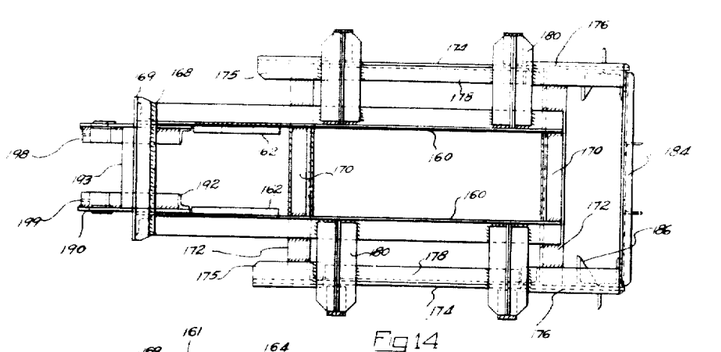
Figure 15:
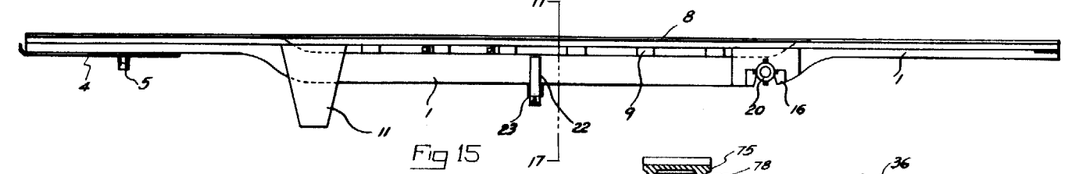
Fig. 15 is a side view and Fig. 16 is a plan view of the framework of the trailer chassis.
Figure 16:
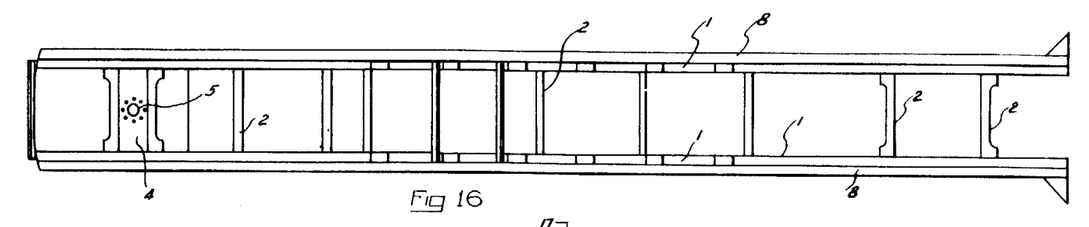

The frame for the rear section of the dual bogie is shown in detail in Figs. 9, 13 and 14. In the form shown, it is made of many structural parts all welded together, but the specific structural details are unimportant.

The frame which is illustrated comprises two parallel main angle iron beams 160 which extend from the front end of the section to a point near the rear end thereof, the rear portions of the vertical flanges being inclined downwardly as shown in Fig. 13 so as to avoid any interference with the chassis. Near its front end each vertical flange is cut away, as at 161, to provide for the rear hanger shaft 165 (Fig. 9), and at this point two vertical brackets 162 are welded to the inner surfaces of the vertical flanges. These brackets have the circular openings 164 which receive the rear hanger shaft 165. A key 166 is secured to the face of one of the brackets and engages a slot cut in the shaft. The ends of the shaft, which is hollow, are covered by plates 167.

At the front of the section the beams 160 are connected by a transverse angle iron sill 168 and over this sill is located a supplementary angle 169. The front faces of the members 168—169 provide the surface to which the male members 150 of the "heel and toe" action are fastened. At an intermediate point and across the rear of the frame are located angle iron cross members 170 which extend between the beams and longer angle iron cross members 172 which extend below and beyond either side of the beams.

On either side of the main frame are the two parallel side plates 174 which are welded at their ends to gusset plates 175 and 176 that are, in turn, welded to the projecting ends of the cross members 172. At the center of the side plates are welded additional angle irons 178 and traversing the side plates and secured to the beams 160 and the angle irons 178 are the brackets 180 which support the spring pads 181 which bear on the ends of the rear auxiliary springs 48'. The ends of the rear main springs 45' are received in housings 182 attached to the ends of the side plates 174.

Across the rear ends of the side plates is the end plate 184 and depending at the corners thereof are the brackets 185 and vertical angle irons 186 which provide the anchorage for the rear ends of the rear radius rods 68' for the rear axle housing 62'.

To the front of the rear section are secured two parallel, downwardly and forwardly inclined arms 190 which together constitute a pedestal for supporting the forward end of the rear section on the forward section of the dual bogie. The upper ends of these arms have extensive areas of contact with the frame and are strengthened by angle iron braces 192 and cross-connected by a transverse angle iron beam 193.

Figure 7:
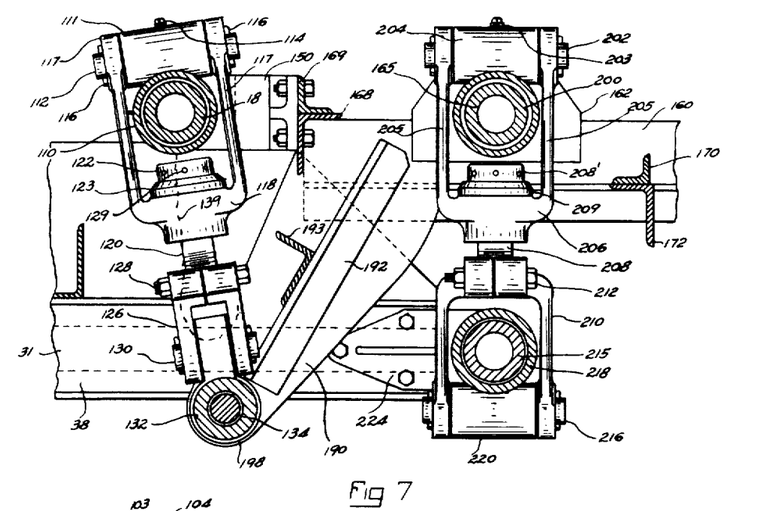
Fig. 7 is a vertical longitudinal section through the articulated portion of the dual bogie on the line 7—7 of Fig. 4.

Near their lower ends the arms are provided with reinforcing plates 195 and the arms are drilled at this point to provide anchorage for the ends of the safety chains 139. These chains are not shown in full as they are merely safety adjuncts, but their location is indicated by the dotted line 139 in Fig. 7.

On the lower ends of the arms are welded two aligned hubs 198 which surround the transverse bearing shaft 134 on either side of the hanger from the forward section. (See Fig. 8.) Set screws 199 fix the shaft 134 in the hubs.

The rear hanger

Located on the shaft 165 at the center line of the trailer is the heavy rotatable bearing sleeve 200 similar to the sleeve 110 on the forward section. This sleeve is welded to a secondary bearing sleeve 201 in which is located the shaft 202. Lubrication is provided through the plugged opening 203. Suspended from the shaft 202 in a vertical position are the parallel arms 205 of a yoke 206. In the center of the yoke is rotatably mounted the vertical pin 208, the head 208' of which rests upon the bearing washer 209 at the base of the yoke. The lower end of the pin is screw-threaded to receive the threaded portion of a depending clevis 210, the threaded portion of the clevis being split and held in adjusted position on the lower end of the pin 208 by a clamping bolt 212. The pin 208 is provided with means to turn it for adjusting the overall length of the rear hanger in the same manner that the forward hanger is adjusted.

The parallel arms of the yoke or clevis 210 span a secondary trunnion shaft 215 which extends across the rear section. To support this trunnion shaft in the yoke 210, the extremities of the yoke arms rotatably support a transverse shaft 216 on which is mounted a sleeve 220 similar to the sleeve 111 and 204 but reversed. The trunnion shaft 215 is mounted for rotation in a long bearing sleeve 218 welded to the sleeve 220.

It is necessary that this lower or secondary trunnion shaft 215 be fixedly mounted on the rear end of the forward section of the dual bogie. For this purpose the ends of the shaft 215 extend to points adjacent the rear lower corners of the forward frame 30 where they are clamped by bolts 221 in the split bearings 222 formed on the ends of stout brackets 224 which are extended forwardly where they are received between the angle irons 38 referred to in the description of the forward bogie frame and at which point they are bolted and welded to the frame (see Figs. 11 and 12).

It will be seen that the shaft 215 constitutes an axis about which the rear section may rock with respect to the forward section. The rear hanger constitutes a universal joint which permits the rear section to swing on the fulcrums 145 and 150 in the manner which has been described.

Résumé

It is believed that the operation of the tandem-axle assembly will have been made clear from the above description and only a brief résumé will be attempted.

The chassis has the capacity of rocking with respect to the dual bogie assembly about the main trunnion shaft 18. Except for this vertical rocking movement which permits the tractor and trailer to oscillate in response to undulations in the road surface, the trailer chassis and the forward section of the dual bogie move in unison and the stabilizer at the forward axle dampens side sway which is imparted to the vehicle.

The articulated connection between the forward section and the rear section may be roughly likened to an inverted letter N (И) which is formed by the forward hanger, the pedestal 190 and the rear hanger. The two extremities of this inverted N are anchored with respect to the forward section, but the other points are permitted to float and as the connections at all points are universal pivots, there is a complete freedom of movement which permits the rear section to rock about a transverse horizontal axis. This permits the rear section to rise and fall as it passes over irregularities in the road surface which have been passed over by the forward section. In addition, the rear section may twist with respect to the forward section upon a horizontal axis parallel to the center line of the vehicle, in which movement both of the hangers will participate. Still further, the rear section may swing or swivel laterally with respect to the forward section in which action both hangers participate. This swinging movement is preferably of the "heel and toe" variety about the separable fulcrums which, for the reasons stated, causes the rear wheels to track perfectly in the path of the front wheels and which also reduces the tendency of the rear section to whip about. The "heel and toe" action is preferred for the reasons stated, but the N form of articulation is adaptable to and may be used with a one point swivel connection. It will be noted, however, that the forward end of the rear section cannot move downwardly about the shaft 215 beyond the point shown in Fig. 7 for such movement would be resisted by the contact of the members 145—150. This inhibits any tendency of the dual bogie to buckle upon itself.

The downward thrust of the load is transmitted from the chassis through the main trunnion shaft 18 to the frame 30, thence to the secondary trunnion shaft 215 and through the rear hanger to the rear frame. As the rear hanger is carried forwardly of the rear axle, the load tends to rock the front end of the rear section of the dual bogie downwardly and this movement is resisted by the pedestal which is, in turn, supported by the forward hanger. Thus the load is distributed by the connections to the two sections of the dual bogie and as the shaft 18 is midway between the front and rear axles, each section shares equally in the load.

Again, as the thrust exerted by the load on the rear section is downwardly at its forward end the two sections are drawn together by the load itself and this not only prevents the two sections from separating, but also holds the fulcrum 145—150 together, contributing to dampening whipping action in the rear section.

The above theoretical discussion is offered as an explanation for the unusual behavior of the dual bogie by which it achieves the various advantages set forth herein.

It will be appreciated that having explained the underlying and novel principles of the construction, those principles may be applied to other designs and to improved and modified methods of making articulated running gear of the tandem-axle type.

It may be desirable in some cases to provide means for limiting the swinging movement of the rear bogie section about the selective pivots and for this purpose the mechanism shown in Fig. 18 has been designed.

In that view a cross member 230 is attached to one section of the dual bogie and another cross member 231 is attached to the other section. These sections are designated 38' and 160' respectively and correspond functionally to members 38 and 160. In the interest of clarity, the showing of such elements as the universal connections are omitted. Two rounded fulcrum members 233 are secured to the face of cross member 230 and two mating sockets 234 are secured to the opposing face of the member 231 so that the rear bogie section will rock alternatively about these two couples. A stout pivot pin 235 is pivotally mounted in each member 233 and integral with this pin is a bar 236 which extends through an elongated opening 238 through the base of the socket 234 and the cross member 231. The bar 236 is headed as at 239 so as to limit the extent of angular movement. While the degree of movement may be varied, an angular displacement of 20° is advisable.

While the invention is shown in connection with a trailer-tractor assembly, the articulated connections may be employed in any form of vehicle, whether of the trailer or self-propelled type, in which it may be desirable to incorporate a dual bogie. As the specific form of the invention which has been chosen for illustration is a trailer, the description has contained repeated reference to a trailer, but this is not to be considered as limiting the invention to that particular type of vehicle.

What is claimed is:

1. A trailer having a chassis, means at the forward end of the chassis for pivotal connection to a tractor, a dual bogie for supporting the chassis, said dual bogie comprising forward and rear sections, a horizontal trunnion connecting the chassis and one of said sections, and articulated connections between the two said sections which permit the second section to rock freely in all directions with respect to the first section.

2. A trailer having a chassis, means at the forward end of the chassis for pivotal connection to a tractor, a dual bogie for supporting the chassis, said dual bogie comprising a forward section and a rear section, a horizontal pivotal connection between the chassis and the forward section, and articulated connections between the sections which permit the latter to rock freely in all directions with respect to the forward bogie section.

3. A trailer having a chassis, pivotal means at the forward end of the chassis for connection with a tractor, a bogie section beneath the chassis, a horizontal trunnion connecting the said bogie section and the chassis, an axle for the said section, a stabilizer connected with the axle to reduce side sway of the trailer, a second bogie section behind the first named section, and freely universal jointing means connecting the two said sections which permits the second section to rock independently of the first said section.

4. A trailer having a chassis, means at the forward end of the chassis for pivotal connection with a tractor, a dual bogie beneath the chassis, said dual bogie comprising two aligned sections, a horizontal trunnion connecting the forward bogie section and the chassis, an axle for the said forward bogie section, a stabilizer connected with the axle to reduce side sway of the said bogie section, and articulated connections between the two said sections, said connections including hangers having universal joints which permit the rear section to rock in all directions with respect to the forward section.

5. The combination of a chassis, a dual bogie beneath the chassis, said dual bogie comprising two aligned sections, a horizontal trunnion connecting the forward bogie section and the chassis, an axle on the said forward bogie section, a stabilizer connected with the axle to reduce side sway of the said bogie section, and articulated connections between the two said sections, said connections including hangers having universal joints which permit the rear section to rock in all directions with respect to the forward section.

6. In a trailer construction, a chassis and a support for the chassis, said support comprising forward and rear bogie sections, means to connect the forward section and the chassis, and articulated and load distributing connections between the sections which permit the rear section to have freely universal swinging movement with respect to the forward section, and which transmits a portion of the load to the rear section.

7. In a trailer construction, a chassis and a support for the chassis, said support comprising forward and rear bogie sections, means to connect the forward section and the chassis, and articulated and load distributing connections between the sections which permit the rear section to have freely universal swinging movement with respect to the forward section, and said connection between the forward section and the chassis being so located as to transmit equal portions of the load to both sections.

8. In a vehicle, a chassis and a support for the chassis, said support comprising a dual bogie having forward and rear bogie sections, a horizontal trunnion connecting the forward section and the chassis, and articulated and load distributing connections between the sections, said connections including a plurality of universally jointed hangers which permit the rear secton to have freely universal swinging movement with respect to the forward section, and which transmit a portion of the load to the rear section.

9. In a vehicle, a chassis and a support for the chassis, said support comprising a dual bogie having forward and rear sections, a horizontal trunnion connecting the forward section and the chassis, and articulated and load distributing connections between the sections, said connections including two universally jointed hangers which permit the rear section to have freely universal swinging movement with respect to the forward section, said trunnion being so located that equal portions of the load are transmitted to the sections.

10. A dual bogie construction for vehicles comprising a forward bogie section and a rear bogie section, a transverse shaft on the forward bogie section, a hanger depending from said transverse shaft, said hanger having means for permitting universal movement, a second transverse shaft on the rear bogie section, a second hanger depending from the last named transverse shaft, said second hanger also having means for universal movement, a shaft at the lower end of the first hanger, a rigid arm connecting the last named shaft and the rear bogie section, a second shaft at the lower end of the second hanger, and a bearing for the second shaft fixed to the forward bogie section.

11. A dual bogie construction for vehicles comprising a forward wheeled bogie section and a rear wheeled bogie section, a transverse shaft on the forward section, a universally jointed hanger depending from said transverse shaft, a second transverse shaft on the rear section, a second universally jointed hanger depending from the second transverse shaft, a rigid arm fixed to the forward end of the rear section and pivotally connected to the lower end of the first named hanger, and a pivotal connection between the lower end of the second hanger and the forward section.

12. A dual bogie construction for vehicles comprising a forward wheeled bogie section and a rear wheeled bogie section, a transverse shaft on the forward bogie section, a universally jointed hanger depending from said transverse shaft, a second transverse shaft on the rear bogie section, a second universally jointed hanger depending from the second transverse shaft, a rigid arm extending forwardly and downwardly from the forward end of the rear bogie section and pivotally connected to the lower end of the first named hanger, and a fixed pivotal connection between the lower end of the second hanger and the forward bogie section.

13. A dual bogie construction for vehicles comprising a forward wheeled bogie section and a rear wheeled bogie section, a transverse shaft on the forward bogie section, a universally jointed hanger depending from said transverse shaft, a second transverse shaft located on the rear bogie section forwardly of the rear bogie wheels, a second universally jointed hanger depending from the second transverse shaft, a rigid arm fixed to the forward end of the rear bogie section and pivotally connected to the lower end of the first named hanger, a pivotal connection between the lower end of the second hanger and the forward bogie section, and a pair of separable vertical pivots at the meeting faces of the two sections, said pivots being located on opposite sides of the center line of the bogie.

14. A dual bogie construction for vehicles comprising a forward bogie section and a rear bogie section, a universally jointed hanger depending from the forward bogie section and a second universally jointed hanger depending from the rear bogie section, the lower end of the first named hanger having a pivotal connection with the rear bogie section and the lower end of the second hanger having a pivotal connection with the forward bogie section.

15. A dual bogie construction for vehicles comprising a forward bogie section and a rear bogie section, a universally jointed hanger depending from the forward bogie section and having fore-and-aft swinging movement thereon, a second universally jointed hanger depending from the rear bogie section and having fore-and-aft swinging movement thereon, shafts at the lower ends of both hangers and arms on each bogie section extending toward the other and pivotally connected to the said shafts on the other bogie section.

16. A vehicle comprising a body, and a dual bogie for the vehicle, said dual bogie comprising a forward section and a rear section, means to support the body on the forward section, a universally jointed hanger depending from the forward section and having fore-and-aft swinging movement thereon, a second universally jointed hanger depending from the rear section and having fore-and-aft swinging movement thereon, shafts at the lower ends of the said hangers, and a bearing on each section in which the shaft on the other bogie is received.

17. A vehicle comprising a body, and a dual bogie for the vehicle, said dual bogie comprising a forward section and a rear section, a horizontal trunnion located midway between the bogie axles for supporting the body on the forward section, a universally jointed hanger depending from the forward section and having fore-and-aft swinging movement thereon, a second universally jointed hanger depending from the rear section and having fore-and-aft swinging movement thereon, shafts at the lower ends of the said hangers, and a bearing on each section in which the shaft on the other section is received.

18. A vehicle comprising a chassis and a dual bogie for supporting the chassis, said dual bogie comprising a forward section on which the chassis is mounted and a rear section having articulated connections to the forward section so as to have a universal swinging movement in all directions with respect to the forward section, said articulated connections also serving to distribute a portion of the chassis load to the rear section, and a pair of separable fulcrums located at the meeting faces of the two sections and on opposite sides of the center line of the chassis about which the rear section may pivot selectively in swinging to and fro.

19. A vehicle comprising a chassis, and a dual bogie for supporting the chassis, said dual bogie comprising a forward section on which the chassis is mounted and a rear section having articulated connections to the forward section so as to have a universal swinging movement in all directions with respect to the forward section, said articulated connections also serving to distribute a portion of the chassis load to the rear section, and a pair of separable fulcrums located at abutting ends of the sections and on opposite sides of the center line of the chassis about which the rear section may pivot selectively in swinging to and fro.

20. A vehicle comprising a chassis, a dual bogie for supporting the chassis, said dual bogie comprising a forward section and a rear section, a horizontal trunnion connecting the chassis and the forward section, articulated connections between the two sections which permit the rear section to have a universal swinging movement in all directions with respect to the forward section, said articulated connections also serving to distribute a portion of the chassis load to the rear section, the trunnions being located between the wheels of the dual bogie, and a pair of separable fulcrums located on opposite sides of the center line of the chassis about which the rear section may pivot selectively in swinging to and fro.

21. A vehicle comprising a chassis, a dual bogie for supporting the chassis, said dual bogie comprising a forward section and a rear section, a horizontal trunnion connecting the chassis and the forward section, articulated connections between the two sections which permit the rear section to have a universal swinging movement in all directions with respect to the forward section, said articulated connections also serving to distribute a portion of the load to the rear section, the trunnion being located between the wheels of the dual bogie, and a pair of separable fulcrums located at the abutting ends of the sections on opposite sides of the center line of the chassis about which the rear section may pivot selectively in swinging to and fro.

22. A dual bogie construction for vehicles comprising a forward bogie section, and a rear bogie section, a universally jointed hanger suspended from each bogie section and having fore-and-aft swinging movement thereon, and rigid arms on each bogie section, each arm having a pivotal connection with the hanger on the other bogie section.

23. A dual bogie construction for vehicles comprising a forward bogie section and a rear bogie section, a universally joined hanger suspended from each bogie section and having fore-and-aft swinging movement thereon, rigid arms on each bogie section and pivotally connected to the hanger on the other bogie section, and separable fulcrums at the abutting ends of said bogie sections and located on opposite sides of the center line thereof about which the bogie sections may rock selectively.

24. A dual bogie construction for vehicles, comprising a forward bogie section and a rear bogie section, a universally jointed hanger suspended from each section and having fore-and-aft swinging movement thereon, rigid arms on each section and pivotally connected to the hanger on the other section, separate fulcrums at the abutting ends of said sections and located on opposite sides of the center line thereof about which the section may rock selectively, and means to connect the dual bogie to a vehicle body, said connection being so located and arranged as to distribute the load of the vehicle to both sections.

OTTO I. OYLER.

REFERENCES CITED

The following references are of record in the file of this patent:

UNITED STATES PATENTS

| Number | Name | Date |
|---|---|---|
| 1,066,164 | Thompson | July 1, 1913 |
| 1,871,735 | Prins | Aug. 16, 1932 |
| 1,881,070 | Falk | Oct. 4, 1932 |
| 2,067,861 | Robin | Jan. 12, 1937 |
| 2,107,183 | Huntman | Feb. 1, 1938 |
| 2,155,867 | McIntyre | Apr. 25, 1939 |
| 2,333,853 | Fellabaum | Nov. 9, 1943 |
| 2,401,687 | Letzkus | June 4, 1946 |